(12) United States Patent
Labes

(10) Patent No.: US 6,311,731 B2
(45) Date of Patent: Nov. 6, 2001

(54) METHOD OF ELIMINATING THE PLAY OF A PIPE IN A SECURING ELEMENT AND PIPE WITH A SECURING ELEMENT

(75) Inventor: Manfred Labes, Seligenstadt (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/821,859

(22) Filed: Mar. 30, 2001

(30) Foreign Application Priority Data

Mar. 30, 2000 (DE) .............................. 100 15 825

(51) Int. Cl.$^7$ ....................................... F16L 3/00
(52) U.S. Cl. .................. 138/106; 138/108; 248/62; 248/49
(58) Field of Search .................... 138/106, 108; 248/49, 58, 62

(56) References Cited

U.S. PATENT DOCUMENTS 3,891,006 * 6/1975 Lee ........................................ 138/106
4,338,045 * 7/1982 Cour ................................. 138/106 X

FOREIGN PATENT DOCUMENTS

3812320C2    12/1999   (DE) .

* cited by examiner

*Primary Examiner*—Patrick Brinson
(74) *Attorney, Agent, or Firm*—Herbert L. Lerner; Laurence A. Greenberg; Werner H. Stemer

(57) ABSTRACT

The method eliminates the play of a pipe in a securing element. At least one hole is formed in the securing element from the outside, and a clearance between the pipe and the securing element is filled with a curing compound, which is filled through the hole. The compound, which preferably contains epoxy with metal shavings, cures in the clearance.

15 Claims, 1 Drawing Sheet

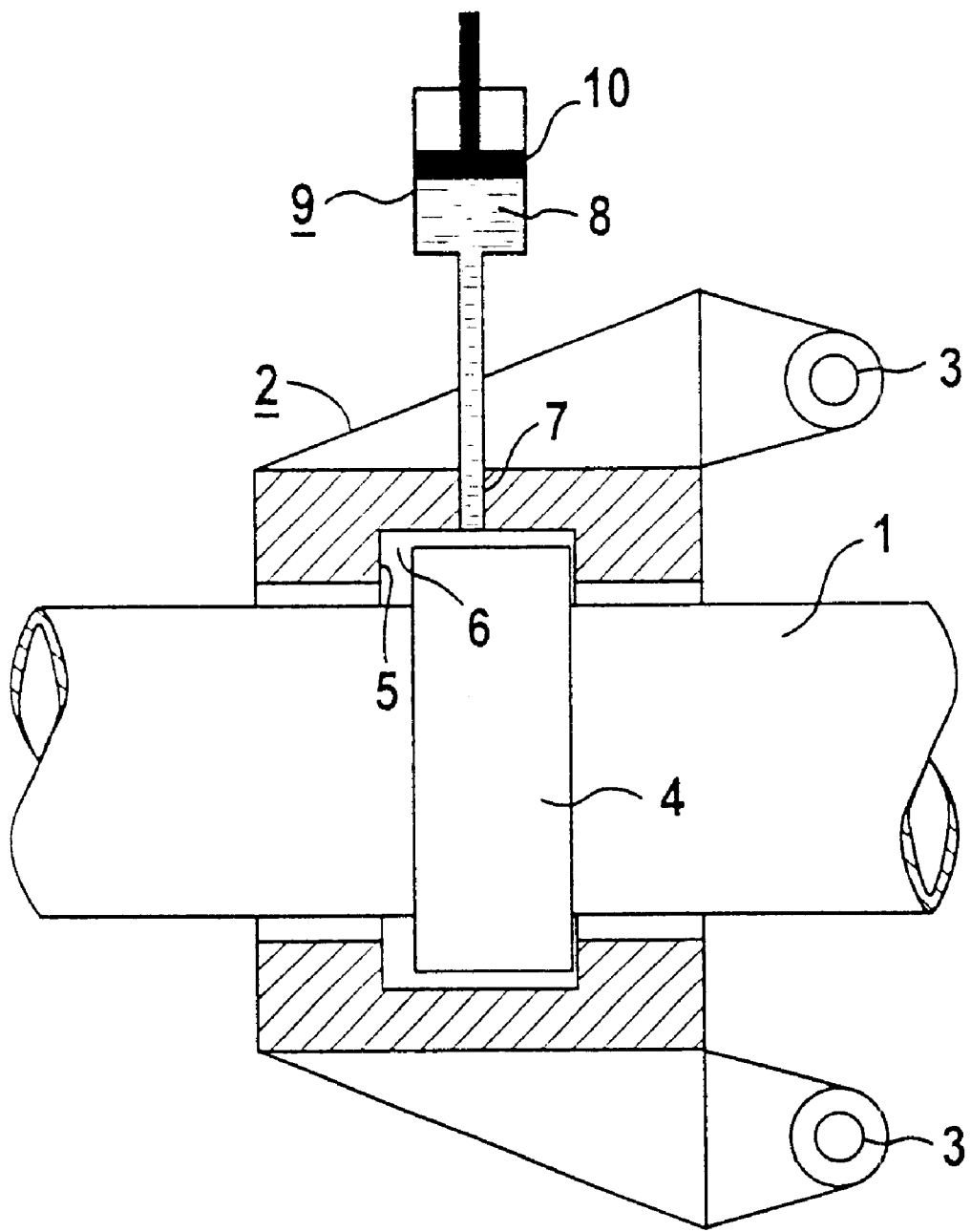

METHOD OF ELIMINATING THE PLAY OF A PIPE IN A SECURING ELEMENT AND PIPE WITH A SECURING ELEMENT

BACKGROUND OF THE INVENTION

Field of the Invention

The invention lies in the mechanical arts. More specifically, the invention relates to a method of eliminating the play of a pipe in a securing element when a formation on the pipe or a part connected to the pipe engages in a recess of the securing element in such a way as to leave a clearance.

The invention also relates to a pipe with a securing element. A formation on the pipe or a part connected to the pipe engages in a recess of the securing element in such a way as to leave a clearance.

A pipeline system forming part of a power plant, for example, comprises pipes which are fastened on supporting structures by securing elements. In order that movements of the pipeline system can be largely suppressed, certain securing elements are designed as fixed points. At those fixed points, the pipe is firmly arrested, while at other securing elements the pipe is held in such a way that, for example, heat-induced expansions of the pipe are possible.

Even in a securing element which serves as a fixed point, the pipe is often mounted in the securing element with a certain amount of play. The play is attributable to production tolerances or to the assembly operation. Even with a relatively small amount of play, vibrations of the pipe can damage the securing element, in particular knock it out.

Corresponding problems also arise in the case of a securing element which, although not representing a fixed point, is intended to arrest the pipe relative to at least one degree of freedom.

To eliminate disruptive play of a pipe in a securing element, it has previously been necessary for the securing element to be disassembled. Then a shim was inserted into the recess of the securing element, the shim being dimensioned in such a way as to allow the pipe subsequently to be held without any play.

The opening of the securing element, the inserting of the shim and the subsequent renewed closing of the securing element is very time-consuming. In addition, complex means and equipment are necessary. Often a scaffold has to be erected and hoists have to be provided for holding the pipe during the assembly on the securing element.

SUMMARY OF THE INVENTION

The object of the present invention is to provide a method of eliminating the play of a pipe in a securing element which overcomes the above-noted deficiencies and disadvantages of the prior art devices and methods of this general kind, and which can be carried out quickly and reliably by simple means. It is a further object to provide a pipe with a securing element which does not have any undesired clearance between the pipe and the securing element and can be quickly produced with simple means and little effort.

With the above and other objects in view there is provided, in accordance with the invention, a method of eliminating play of a pipe in a securing element, wherein a formation on the pipe engages in a recess formed in the securing element and leaves a clearance therein, the method which comprises:

forming a hole in the securing element leading from an outside into the clearance; and filling the clearance with a curing compound through the hole.

In accordance with an added feature of the invention, the hole is formed by drilling the hole from the outside of the securing element to the recess formed in the securing element.

The novel method achieves the advantage that the securing element does not have to be opened to eliminate the play. The securing element continues to hold the pipe firmly and reliably while the play is being eliminated. Therefore, no complex scaffolds or hoists are necessary. In particular, the securing element does not need to be disassembled, not even partially, to eliminate the play.

In accordance with an added feature of the invention, the clearance is filled with a sealing compound which contains, for example, epoxy resin and metal turnings or other metal particles. Some other filling material may also be used, however, provided that it cures at the operating temperature of the pipeline and remains hard and is also resistant under pressure in the clearance.

The above-mentioned formation may be integrally formed on the pipe or it may be a separate part mounted to the pipe. By way of example, the formation on the pipe is a collar running around the pipe. It may also be a protuberance. Both the collar and the protuberance, which generally consist of metal, engage in a suitable recess of the securing element. There may also be a plurality of protuberances, which engage in their assigned recesses.

The securing element is, for example, a clip, which may be of a two-part construction. In the assembled state, it encloses the pipe, its two parts then being screwed to each other. The clip is fastened in a customary way on a supporting structure, for example on a wall of a building.

With the above and other objects in view there is also provided, in accordance with the invention, a mounting assembly of a pipe and a securing element, comprising:

a securing element having a recess formed therein and a hole leading into said recess;

a pipe carrying a formation engaging in said recess and leaving a clearance in said recess; and a compound filled into said clearance through said hole and cured in said clearance.

Such a combination of a pipe and a securing element achieves the advantage of preventing an undesired movement of the pipe in relation to the securing element. Consequently, pipe movements cannot cause damage to the securing element.

In accordance with an added feature of the invention, the compound is a sealing compound containing epoxy resin and metal turnings or shavings or other metal particles. It may also be filled, however, with some other filling material which is distinguished by the fact that it cures at the operating temperature of the pipe and remains hard and is also resistant under pressure.

The formation on the pipe may be a collar running around the pipe. It may also be a protuberance. The collar or the protuberance, which generally consist of metal, engage in a recess of the securing element. There may also be a plurality of protuberances, which engage in their assigned recesses. The securing element is, for example, a clip, which may be of a two-part construction, and is fastened on a supporting structure, for example on a wall of a building.

The method and the combination of a pipe and a securing element according to the invention achieve in particular the advantage that an amount of play brought about by production or assembly between a pipe and a securing element can be quickly and reliably eliminated by simple means. This also applies to play caused in the course of operation by movements of the pipe in the securing element. Stable arrestment of the pipe in the securing element after eliminating the play is always ensured.

Other features which are considered as characteristic for the invention are set forth in the appended claims.

Although the invention is illustrated and described herein as embodied in a method of eliminating the play of a pipe in a securing element and pipe with a securing element, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWINGS

The sole FIGURE is a partly sectional, partly elevational view of the novel assembly according to the invention.

DESCRIPTION OF THE PREFERRED EMBODIMENTS

Referring now to the sole figure of the drawing in detail, there is shown a pipe 1 held in a securing element 2. The latter may be a clip. Formed on the securing element 2 are fastening devices 3 with which the securing element 2 can be fastened to a non-illustrated supporting structure. A peripheral collar 4 is formed on the pipe 1 which engages in a recess 5 formed in the securing element 2. For production or assembly reasons, possibly also on account of damage, a clearance 6 exists between the collar 4 and the limit surfaces of the recess 5 in the assembled state.

To eliminate the undesired play of the pipe 1 in the securing element 2, a hole 7 is formed, for example by drilling or boring, into the securing element 2. The hole 7 leads from the outside into the clearance 6. To eliminate the play, the clearance 6 is filled with a compound 8 which is allowed to cure there. The compound 8, by way of example, is a sealing compound which contains epoxy resin and metal turnings. The compound 8 can be injected by an injection device 9, which has for example a manually actuated plunger 10, through the hole 7 into the clearance 6 until the entire clearance 6 is filled. Then, no disruptive movement of the pipe 1 in relation to the securing element 2 is possible any longer.

I claim:

1. A method of eliminating play of a pipe in a securing element, wherein a formation on the pipe engages in a recess formed in the securing element and leaves a clearance therein, the method which comprises:

forming a hole in the securing element leading from an outside into the clearance; and filling the clearance with a curing compound through the hole.

2. The method according to claim 1, wherein the forming step comprises drilling the hole from the outside of the securing element to the recess formed in the securing element.

3. The method according to claim 1, wherein the filling step comprises filling the clearance with a sealing compound containing epoxy resin and metal turnings.

4. The method according to claim 1, wherein the formation is integrally formed on the pipe.

5. The method according to claim 1, wherein the formation is a separate part mounted to the pipe.

6. The method according to claim 1, wherein the formation on the pipe is a collar running around the pipe.

7. The method according to claim 1, wherein the formation on the pipe is a protuberance.

8. The method according to claim 1, wherein the securing element is a clip.

9. A mounting assembly, comprising:

a securing element having a recess formed therein and a hole leading into said recess;

a pipe carrying a formation engaging in said recess and leaving a clearance in said recess; and a compound filled into said clearance through said hole and cured in said clearance.

10. The mounting assembly according to claim 9, wherein said compound is a sealing compound containing epoxy resin and metal turnings.

11. The mounting assembly according to claim 9, wherein the formation is integrally formed on the pipe.

12. The mounting assembly according to claim 9, wherein the formation is a separate part mounted to the pipe.

13. The mounting assembly according to claim 9, wherein said formation on said pipe is a collar running around the pipe.

14. The mounting assembly according to claim 9, wherein said formation on said pipe is a protuberance.

15. The mounting assembly according to claim 9, wherein said securing element is a clip.

* * * * *